US011157610B2

(12) United States Patent
Adda

(10) Patent No.: US 11,157,610 B2
(45) Date of Patent: Oct. 26, 2021

(54) METHOD FOR ACCESSING A SECURE COMPUTER RESOURCE BY A COMPUTER APPLICATION

(71) Applicant: WALLIX, Saint-Honoré (FR)

(72) Inventor: Serge Adda, Antony (FR)

(73) Assignee: WALLIX, Saint-Honoré (FR)

( * ) Notice: Subject to any disclaimer, the term of this patent is extended or adjusted under 35 U.S.C. 154(b) by 201 days.

(21) Appl. No.: 16/492,890

(22) PCT Filed: Jan. 26, 2018

(86) PCT No.: PCT/FR2018/050183
§ 371 (c)(1),
(2) Date: Sep. 10, 2019

(87) PCT Pub. No.: WO2018/162810
PCT Pub. Date: Sep. 13, 2018

(65) Prior Publication Data
US 2020/0074066 A1   Mar. 5, 2020

(30) Foreign Application Priority Data

Mar. 10, 2017   (FR) ........................ 1752004

(51) Int. Cl.
*H04L 9/00*   (2006.01)
*G06F 21/44*   (2013.01)
(Continued)

(52) U.S. Cl.
CPC .............. *G06F 21/44* (2013.01); *G06F 21/53* (2013.01); *G06F 21/57* (2013.01)

(58) Field of Classification Search
CPC .......... G06F 21/44; G06F 21/53; G06F 21/57; G06F 21/445
See application file for complete search history.

(56) References Cited

U.S. PATENT DOCUMENTS 9,160,545 B2   10/2015   Iverson et al.
2011/0107409 A1*   5/2011   Wilkinson .............. G06F 21/41
726/8
(Continued)

FOREIGN PATENT DOCUMENTS

EP   2122526 B1   11/2009
WO   2016/199166 A1   12/2016

OTHER PUBLICATIONS

Anonymous, CA Privileged Access Manager—2.7 Credential Manager A2A, Updated Feb. 14, 2017, https://techdocs.broadcom.com/content/broadcom/techdocs/us/en/ca-enterprise-software/layer7-privileged-access-management/privileged-access-manager/3-0-1/introduction/credential-manager-overview/credential-manager-a2a.html, retrieved Sep. 28, 2017, 4 pages.

(Continued)

*Primary Examiner* — Beemnet W Dada
(74) *Attorney, Agent, or Firm* — TraskBritt

(57) ABSTRACT

A method for accessing a secure computer resource by a computer application having no human-machine interaction for inputting authentication information comprises: a) a first initialization step comprising the creation of a temporary cryptographic key consisting of applying a cryptographic process to a plurality of information that is invariant over time and of encrypting, using the thus calculated key, authentication data of an account authorized to access a vault with passwords and b) steps for automatic access by the application to the secure computer resource consisting of creating a temporary cryptographic key consisting of applying a cryptographic process to the plurality of information that is invariant over time, reading the credentials file created during the initialization step and decrypting the credentials file with the temporary cryptographic key cal- (Continued)

culated in the preceding step, then transferring, to the calling application, the data coming from the computer resource.

10 Claims, 2 Drawing Sheets

(51) Int. Cl.
*G06F 21/53* (2013.01)
*G06F 21/57* (2013.01)

(56) References Cited

U.S. PATENT DOCUMENTS

| | | |
|---|---|---|
| 2014/0250511 A1* | 9/2014 | Kendall .............. G06F 21/6281 726/6 |
| 2017/0041309 A1* | 2/2017 | Ekambaram ............ G06F 21/44 |
| 2018/0198614 A1* | 7/2018 | Neumann ............... H04L 9/321 |

OTHER PUBLICATIONS

CA Technologies, A2 Client Connection Security—CA Privileged Access Manager—2.8.1, https://techdocs.broadcom.com/content/broadcom/techdocs/us/en/ca-enterprise-software/layer7-privileged-access-management/privileged-access-manager/2-8-1/introduction.html, Dec. 28, 2016, 4 pages.

International Search Report for International Application No. PCT/FR2018/050183 dated Mar. 28, 2018, 3 pages.

International Written Opinion for International Application No. PCT/FR2018/050183 dated Mar. 28, 2018, 9 pages.

\* cited by examiner

METHOD FOR ACCESSING A SECURE COMPUTER RESOURCE BY A COMPUTER APPLICATION

CROSS-REFERENCE TO RELATED APPLICATIONS

This application is a national phase entry under 35 U.S.C. § 371 of International Patent Application PCT/FR2018/050183, filed Jan. 26, 2018, designating the United States of America and published as International Patent Publication WO 2018/162810 A1 on Sep. 13, 2018, which claims the benefit under Article 8 of the Patent Cooperation Treaty to French Patent Application Serial No. 1752004, filed Mar. 10, 2017.

TECHNICAL FIELD

The present disclosure concerns the field of access to a secure computer resource by a computer application without human-machine interaction and more particularly the management of passwords from application to application.

BACKGROUND

It concerns, for example, access to computer applications hosted on a WebSphere Application Server (trade name) platform. For example, it concerns access to applications hosted on a Web Sphere platform (trade name of IBM) offering a set of developed solutions that make it possible to develop, deploy and use corporate applications, even in complex cases involving heterogeneous applications and hardware.

Many applications, web services and software solutions require access to resources such as databases or file servers, for example. Access to these resources requires authentication, usually by means of an account name and password.

To automate such a communication process, one solution is to include the application's plain text identification information in configuration files and scripts.

Administrators generally find it difficult to identify, change and manage these passwords and, as a result, passwords remain static and unchanged, creating security breaches.

As a result, powers remain unchanged, which can lead to unauthorized access to sensitive systems. Thus, hard coding references can make technicians' work easier, but are also an easy launch point for hackers.

Different solutions have been proposed in the previous art to automate password management in "application-to-application" contexts.

U.S. Pat. No. 7,823,192 describes a solution that allows disparate secure applications to communicate directly with other applications in a heterogeneous application environment, providing for the creation of tokens that can be transmitted between applications without human intervention.

In this prior art document, security information is passed between applications in the form of a token with chain data that can be recognized by a large number of applications. The token has no header and therefore no application-specific header configuration, making it an independent platform. This eliminates the need to convert security information from one format to another. The use of tokens also eliminates the need for an authentication and authorization request each time a message is sent to another application. Instead of a permanent context or session, a context is created with each invocation from one application to another.

European Patent Application EP2122526 describes an alternative solution for managing proof of identity, including:
  an interception module configured for intercepting a proof of identity process when the request is received by an application;
  a configuration/setting module configured to read system configurations and settings to manage proof of identity for applications; and
  a proof of identity association module configured to apply a credential association logic based on system configurations and settings.

U.S. Pat. No. 9,160,545 describes another secure access "application-to-application" (A2A) and "database application (A2DB)" solution.

This method provides for the receipt of a registration request to a first digital device of a first request, the receipt of a first program factor associated with the first application, which confirms the first program element, the generation of a first password for a second application based on at least the confirmation of the first program element, and providing the first password to a second digital element.

The solutions of the prior art are not fully satisfactory.

The solution proposed by U.S. Pat. No. 7,823,192 has the disadvantage of requiring modification of all the hosted target computer applications, which is often impossible, especially when the source code of the hosted application is not available.

These solutions are also partial, as they do not offer any solution to protect connection and authentication data.

Lastly, the solution proposed by U.S. Pat. No. 9,160,545 provides for the calculation of an encrypted key transmitted to the target hosted application. This solution does not provide for the security of the original authentication key, which implies a high level of administrative complexity, particularly in the event of a change in the authentication key of the hosted application, for example, if the target hosted application is modified or a new version of the application is installed on the server.

BRIEF SUMMARY

The present disclosure concerns, in its most general sense, a process for accessing a computer resource secured by a computer application without any human-machine interaction for the entry of authentication information, comprising:
  a) a first initialization step comprising:
    a1) creating a transient cryptographic key (not stored in a permanent memory) consisting in applying cryptographic processing to a plurality of information that is invariant over time and representative of the computer environment in which the application is running, and recording the result of this processing,
    a2) encrypting, with the key thus calculated, the authentication data of an account authorized to access a password vault,
    a3) recording in a permanent memory associated with the application the result of this encryption (credential file);
  b) steps for automatically accessing the secure computer resource by the application, consisting of:
    b1) creating a transient cryptographic key (not stored in a permanent memory) consisting of applying cryptographic processing to the plurality of time-invariant information representative of the computer environment in which the application is running, and recording the result of this processing;

b2) reading the credential file created during the initialization step and decrypting the credential file with the transient cryptographic key calculated in the previous step; and b3) during the first execution of the process after the initialization step, b3-1) requesting from the vault by identification with the credential file, to extract the authentication information necessary for accessing the computer resource, b3-2) calculating a fingerprint of the application's calling context based on invariant data representative of that context, b3-3) recording the fingerprint in encrypted form in a permanent memory associated with the application the result of this calculation, b3-4) transferring the data from the computer resource to the calling application b4) during subsequent executions, b4-1) requesting from the vault by identification with the credential file, to extract the authentication information necessary for accessing the computer resource, b4-2) calculating a fingerprint of the application's calling context based on invariant data representative of that context, b4-3) comparing the calculated fingerprint with the fingerprint stored in the local memory, b4-4a) in the case of a difference, refusing the transfer of data to the calling application; and b4-4b) in the case of compliance, transferring the data from the computer resource to the calling application.

According to a first embodiment, the fingerprint is calculated according to digital data including the path to the executable of the application, the hash of the binary code of the executable, the identity under which the application process runs.

According to a second embodiment, the application is executed by an interpreter or a virtual machine, and in that, the fingerprint is calculated according to data obtained by analyzing the command line of the process and searching for the file corresponding to the script or pseudo code of the application and calculating the hash of the pseudo code.

According to a third embodiment, the fingerprint and data extracted from the vault are stored in a local permanent memory in encrypted form in a local cache.

According to a particular embodiment, the fingerprint and data extracted from the digital vault are protected by an obfuscation technique.

According to a first embodiment, the static obfuscation technique consists in deleting the frame pointer register or in replacing program constants with recursive calculations.

According to a second embodiment, the dynamic obfuscation technique consists in blocking the access if a debugging operation is detected.

The present disclosure also concerns a method for initializing an access process to a secure computer resource by a computer application without any human-machine interaction for entering authentication information, as well as a method for automatic access by the application to the secure computer resource in accordance with the access process.

BRIEF DESCRIPTION OF THE DRAWINGS

The present disclosure will be best understood upon reading the following detailed description of a non-limiting exemplary embodiment, while referring to the appended drawings, wherein.

DETAILED DESCRIPTION

Figure 1:
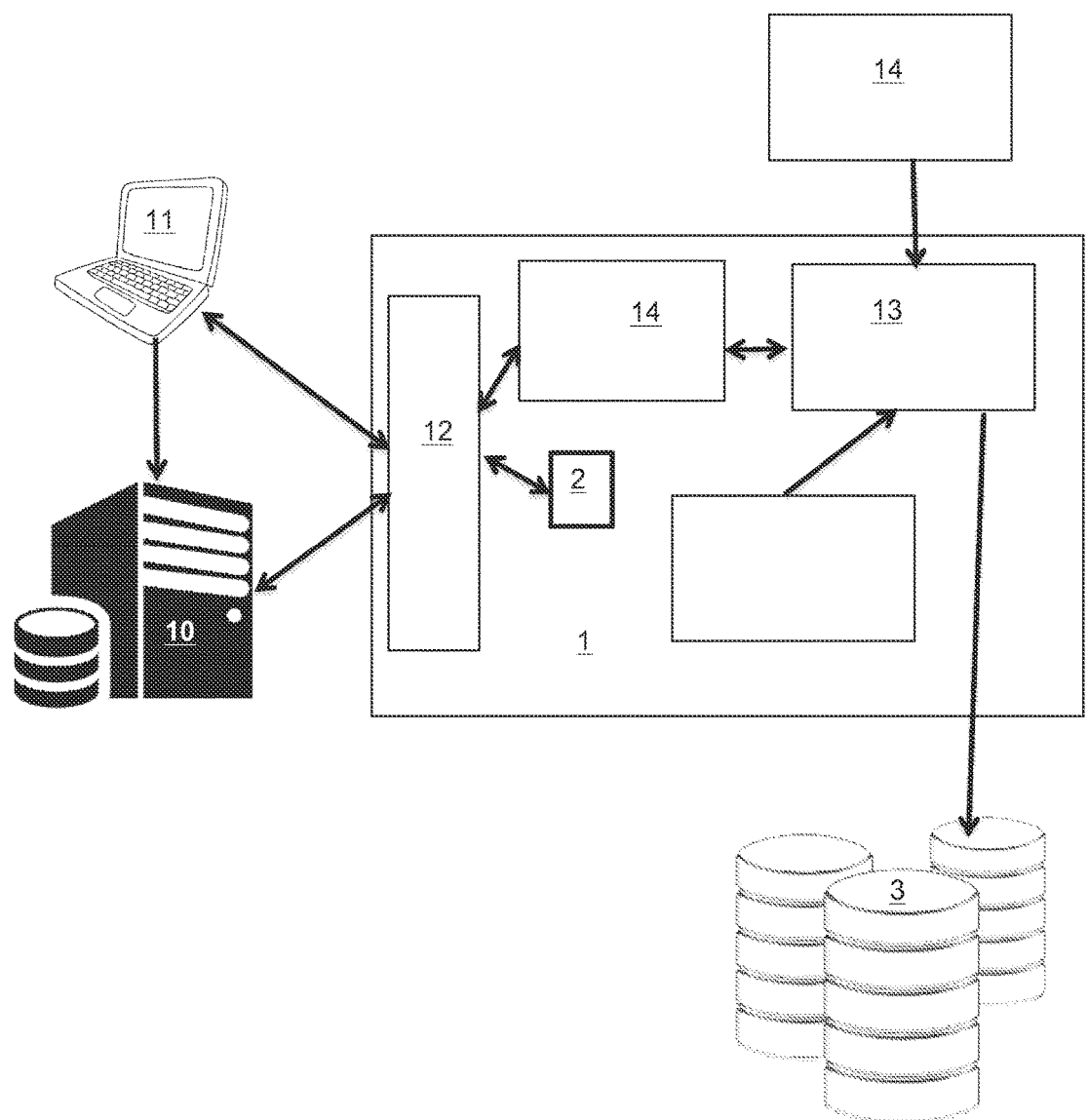
FIG. 1 is a flowchart of the context of the present disclosure.

FIG. 1 is a schematic view of how a solution for accessing resources such as a database by applications hosted by Web Sphere (trade name) works in accordance with the present disclosure.

A client computer (11) on which an Internet browser application is installed communicates with an external web server (10) (Apache, Nginx, IHS . . . ) using the basic HTTP(S) communication protocol to send requests (connection to the server, home page . . . ).

These requests are directed to the internal web server (12) of an application server (1), which directs them to a web container (13). The browser on the client computer (11) can connect directly to the internal server. In the example described, the application server (1) is isolated and connections are made through the external web server (10).

The web container (13) contains Servlets and JSPs (JSP contains dynamic web pages, and Servlets to dynamically create data) and connect when needed to an application or database (3).

The EJB software components that are in the container (13) can communicate with the database (3) to retrieve, modify, delete data, etc. The JDBC interface provides connection to any database such as Oracle, Mysql, etc.

Webservice clients such as mobile/tablet applications can access the application server (1) using the SOAP protocol encapsulated in the HTTP protocol and passed directly through the internal HTTP server.

A pure Java client (14) can connect directly to the EJB container (13) by using EMI/IIOP protocols.

The application (1) running on a remote server (10) reads the information in a configuration file (2) that is saved on the same remote server, to connect to a local or remote database (3) on the same server or a third-party server.

Operational Diagram

The access process according to the present disclosure is divided into three parts:

an initialization process;

an access process during a first execution; and an access process for the subsequent executions.

Initialization Process

Figure 2:
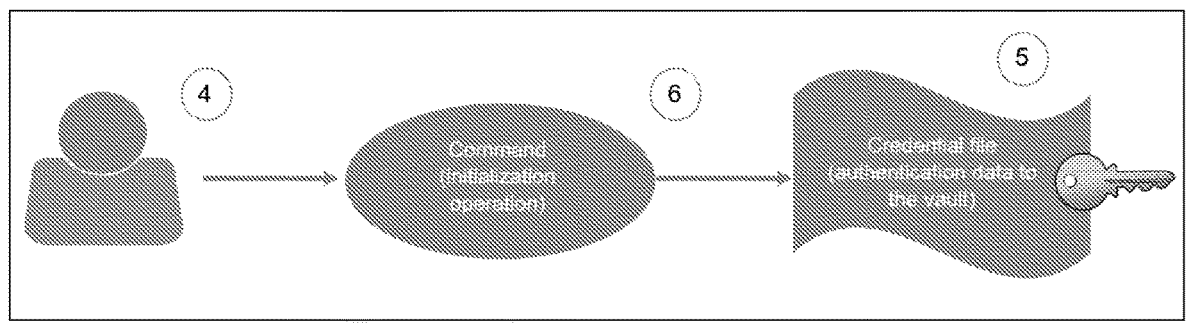
FIG. 2 is a flowchart of the initialization method.

This process illustrated in FIG. 2 consists in calculating a transient cryptographic key by executing a computer code on the Websphere server hosting the target resource, for example, a hosted application.

The user (4) issues the command corresponding to the execution of the process that is the subject of the present disclosure.

This execution controls the initialization step.

This step consists in asking the user to enter the authentication data required to access a digital vault in which the authentication data is stored for the hosted resources to which the Websphere (trade name) server application is to access. The digital vault is stored on a remote device, such as a physical or virtual box.

The command (6) retrieves the authentication data and encrypts them by applying a cryptographic algorithm.

To this end, the command triggers the calculation of a transient key using parameters corresponding to invariant data characterizing the command execution environment. This is, for example:

the name or identifier of the computer on which the command is executed;
the name of the command;
the condensate of the executable code of this command;
the identifier of the owner of the executable.

The authentication data is encrypted with the transitional key thus calculated, and saved on the WebSphere server in a credential file (5).

First Access to the Hosted Resource

Figure 3:
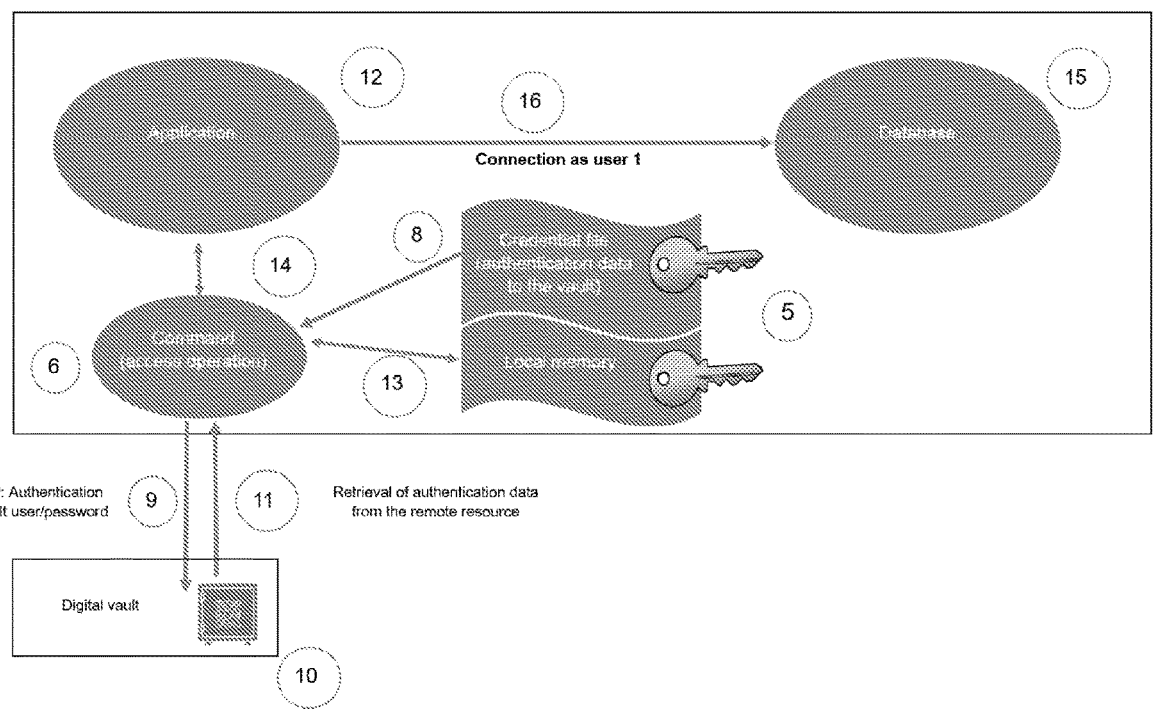
FIG. 3 is a flowchart of the present disclosure.

FIG. 3 illustrates the process of accessing the hosted resource.

The launch of the command (6) by the Websphere server in first access mode causes the execution of a step of retrieval in the credential file (5) of the authentication data allowing access to the resource, in an encrypted form.

The command (6) then launches a step of decrypting (8) the encrypted authentication data using the decryption algorithm based on the same invariant parameters as those that allowed the encryption key to be calculated in the initialization step.

The command then launches a step (9) to access the digital vault (10) containing the authentication data to the remote resource (11) and to calculate the footprint of the calling application (12).

The authentication data to the remote resource (11) and the fingerprint of the calling application (12) are then encrypted with the key used to encrypt the credential file, and the encrypted data is saved in a local memory (13) on the computer on which the Websphere application is executed.

The last step (14) consists in providing the authentication data (11) to the application (12) in order to allow access (16) to the remote resource (15).

Subsequent Access to the Hosted Resource

Subsequent accesses implement the same steps, with the exception of the step before the step (14). Since the fingerprint of the application (12) is already stored in the local memory (13) during the initial access, this already stored fingerprint is compared with the newly calculated one.

If the two fingerprints differ, the processing is interrupted and an error message is displayed.

If this is not the case, the process continues with step (14) consisting in providing the authentication data (11) to the application (12) in order to allow access (16) to the remote resource (15).

Unavailability of the External Web Server (10)

In the event that access to the vault (10) is not possible, the authentication data already stored in the local memory (13) is used without updating.

The invention claimed is:

1. A method of accessing a secure computer resource by a computer application without any human-machine interaction for entering authentication information, comprising:
  a) a first initialization step comprising:
    a1) creating a transient cryptographic key by applying cryptographic processing to a plurality of time-invariant information representative of a computer environment in which the application is running and recording a result of such processing,
    a2) encrypting, with the key thus calculated, authentication data of an account authorized to access a password vault,
    a3) recording in a permanent memory associated with the application a credential file resulting from the encrypting of the authentication data, and
  b) steps for the application to automatically access the secure computer resource consisting of:
    b1) creating a transient cryptographic key by applying cryptographic processing to the plurality of time-invariant information representative of the computer environment in which the application is running, and recording the result of this processing,
    b2) reading the credential file created during the initialization step and decrypting the credential file with the transient cryptographic key calculated in the previous step; and
    b3) during the first execution of the process after the initialization step,
      b3-1) requesting from the vault by identification with the credential file, to extract the authentication information necessary for accessing the computer resource,
      b3-2) calculating a fingerprint of calling context of the application based on invariant data representative of that calling context,
      b3-3) recording the resulting calculated fingerprint in encrypted form in a permanent memory associated with the application,
      b3-4) transferring the data from the computer resource to the calling application b4) during subsequent executions,
      b4-1) requesting from the vault by identification with the credential file, to extract the authentication information necessary for accessing the computer resource,
      b4-2) calculating a fingerprint of the application's calling context based on invariant data representative of that context,
      b4-3) comparing the calculated fingerprint with the fingerprint stored in a local memory, and
      b4-4a) in the case of a difference, refusing the transfer of data to the calling application,
      b4-4b) in the case of compliance, transferring the data from the computer resource to the calling application.

2. The method of claim 1, wherein the fingerprint is calculated according to digital data including the path to the executable of the application, the hash of a binary code of the executable, and the identity under which the process of the application runs.

3. The method of claim 1, wherein the application is executed by an interpreter or a virtual machine, and wherein the fingerprint is calculated according to data obtained by analyzing a command line of the process and searching for the file corresponding to a script or pseudo code of the application and calculating the hash of the pseudo code.

4. The method of claim 1, wherein the fingerprint and data extracted from the vault are protected by an obfuscation technique.

5. The method of claim 4, wherein the static obfuscation technique includes deleting a frame register pointer.

6. The method of claim 4, wherein the static obfuscation technique includes replacing program constants with recursive calculations.

7. The method of claim 5, wherein the obfuscation technique comprises a dynamic obfuscation technique including blocking access in case of detection of a debugging operation.

8. A method for initializing a process for accessing a secure computer resource by a computer application without any human-machine interaction for entering authentication information, in accordance with claim 1, comprising:
- a) a first initialization step comprising:
  - a1) creating a transient cryptographic key by applying cryptographic processing to a plurality of information that is invariant over time and representative of the computer environment in which the application is running, and recording the result of this processing,
  - a2) encrypting with the key thus calculated the authentication data of an account authorized to access a password vault; and
  - a3) saving a credential file resulting from this encryption in a permanent memory associated with the application.

9. A Method for the application to automatically access the secure computer resource according to claim 1, comprising:
- b) steps for automatically accessing the secure computer resource by the application, consisting of:
  - b1) creating a transient cryptographic key (not stored in a permanent memory) consisting of applying cryptographic processing to a plurality of time-invariant information representative of the computer environment in which the application is running, and recording the result of this processing
  - b2) reading the credential file created during the initialization step and decrypting the credential file with the transient cryptographic key calculated in the previous step; and
  - b3) during the first execution of the process after the initialization step,
    - b3-1) requesting from the vault by identification with the credential file, to extract the authentication information necessary for accessing the computer resource;
    - b3-2) calculating a fingerprint of the application's calling context based on invariant data representative of that context;
    - b3-3) recording the fingerprint in encrypted form in a permanent memory associated with the application the result of this calculation; and
    - b3-4) transferring to the calling application the data from the computer resource.

10. A method for the application to automatically access the secure computer resource according to claim 1, comprising:
- b) steps for automatically accessing the secure computer resource by the application, comprising:
  - b1) creating a transient cryptographic key (not stored in a permanent memory) consisting of applying cryptographic processing to a plurality of time-invariant information representative of the computer environment in which the application is running, and recording the result of this processing,
  - b2) reading the credential file created during the initialization step and decrypting the credential file with the transient cryptographic key calculated in the previous step and during executions,
  - b4-1) requesting from the vault by identification with the credential file, to extract the authentication information necessary for accessing the computer resource;
  - b4-2) calculating a fingerprint of the application's calling context based on invariant data representative of that context,
  - b4-3) comparing the fingerprint with the fingerprint stored in the local memory,
    - b4-4a) in the case of a difference, refusing the transfer of data to the calling application, and
    - b4-4b) in the case of compliance, transferring the data from the computer resource to the calling application.

\* \* \* \* \*

UNITED STATES PATENT AND TRADEMARK OFFICE
CERTIFICATE OF CORRECTION

PATENT NO. : 11,157,610 B2
APPLICATION NO. : 16/492890
DATED : October 26, 2021
INVENTOR(S) : Serge Adda It is certified that error appears in the above-identified patent and that said Letters Patent is hereby corrected as shown below:

In the Specification
    Column 1,     Line 30,     change "Web Sphere" to --WebSphere--
    Column 4,     Lines 15-16,     change "Web Sphere" to --WebSphere--

In the Claims
Claim 9,     Column 7,     Line 20,     change "Method" to --method--
Claim 10,     Column 8,     Line 20,     change "processing," to --processing;--
Claim 10,     Column 8,     Line 24,     change "executions," to --executions;--
Claim 10,     Column 8,     Line 31,     change "context," to --context;--
Claim 10,     Column 8,     Line 35,     change "application," to --application;--

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*